2 Sheets--Sheet 1.

I. F. VAN DUZER.

Plumbers' Joints.

No. 6,488. Reissued June 15, 1875.

Witnesses:-
Edith Brookes
J. O. Green.

Inventor:-
Isaac F. Van Duzer
by Colburn Brookes
associate of
Henry Gerner
Atty

2 Sheets--Sheet 2.

I. F. VAN DUZER.

Plumbers' Joints.

No. 6,488. Reissued June 15, 1875.

Witnesses:—
Edith Brookes
J. T. Mew.

Inventor
Isaac F. Van Duzer
by Collom Brookes
associate of
Henry Gerner
Atty

UNITED STATES PATENT OFFICE.

ISAAC F. VAN DUZER, OF MIDDLETOWN, NEW YORK.

IMPROVEMENT IN PLUMBERS' JOINTS.

Specification forming part of Letters Patent No. 150,109, dated April 21, 1874; reissue No. 6,488, dated June 15, 1875; application filed October 16, 1874.

*To all whom it may concern:*

Be it known that I, ISAAC F. VAN DUZER, of Middletown, in the county of Orange and State of New York, have invented a new and useful Improvement in Plumbers' Joints, of which the following is a specification:

My invention relates to improvements in the formation of what are known in the trade as "plumbers' joints." According to my invention the ends of the pipes to be joined are first cut, pared, filed, or otherwise formed so that they may fit into one another. The pipes so formed are then held together by a coupler constructed of lead, over which a layer of solder is wiped or conducted in the usual manner known to plumbers, the object of my invention being mainly to substitute the cheaper metal, lead, for solder in the principal part or base of the joint, the lead being just as good for stiffening the joint as solder, and the joint itself being quite as firm when the lead is wiped or coated over with solder; but that my invention may be fully understood I will describe the same in detail by aid of the accompanying drawings, which form part of this specification.

Figure 3:
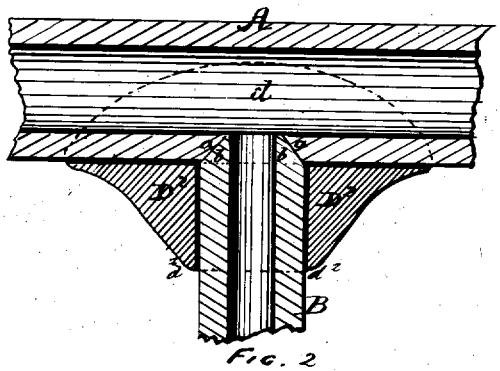
Figure 4:
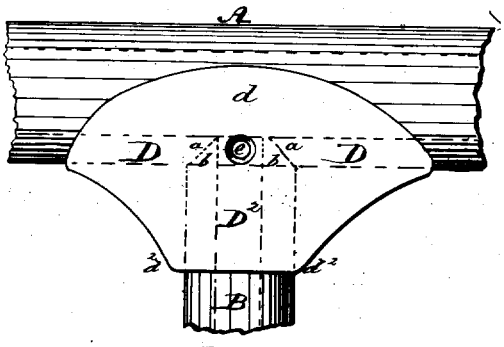
Figure 2:
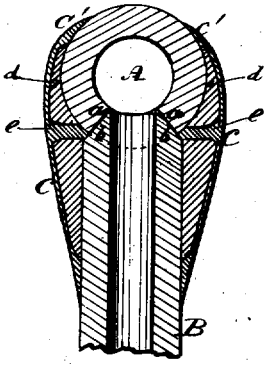
Figure 1:
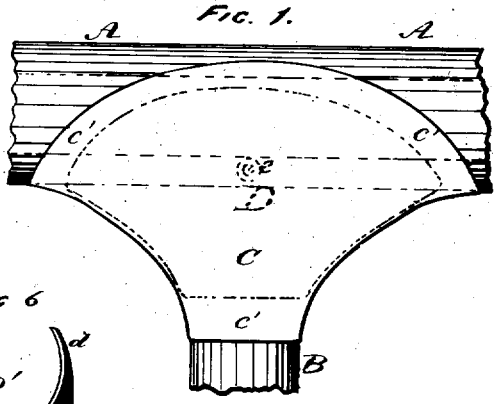
Figure 6:
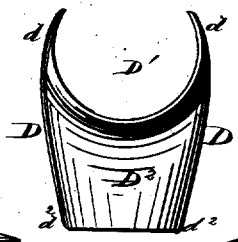
Figure 5:
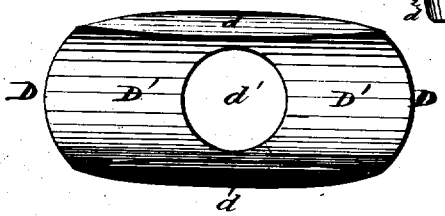
Figure 7:
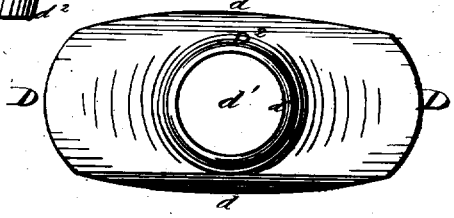
Figure 12:
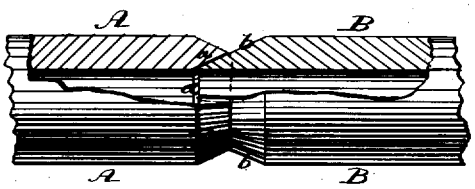
Figure 13:
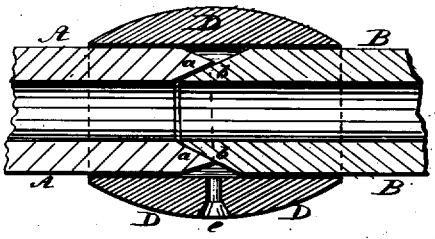
Figure 9:
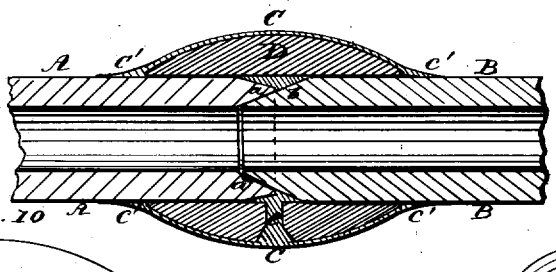
Figure 10:
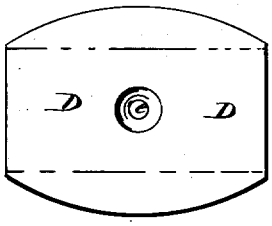
Figure 11:
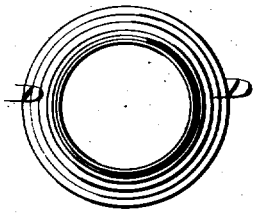
Figure 8:
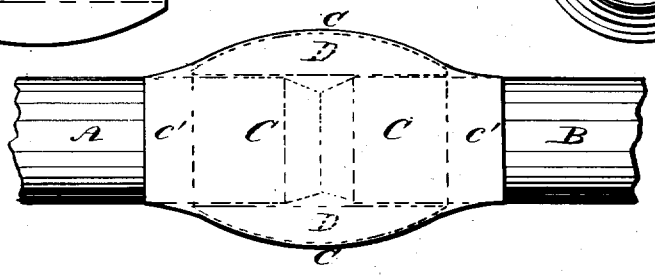

Figure 1 represents a side view, and Fig. 2 a vertical section, of a T-joint formed according to my invention. Fig. 3 represents a vertical section, and Fig. 4 a side view, of the parts in position before being wiped or covered with solder. Fig. 5 is a plan, Fig. 6 an end view, and Fig. 7 an under side view, of a coupler for forming T-joints. Fig. 8 is a side view, and Fig. 9 a section, of a straight joint constructed according to my invention. Fig. 10 is a side view, and Fig. 11 an end view, of the coupler represented in Figs. 8 and 9. Fig. 12 represents a side view, partly in section, of two pipes ready for coupling. Fig. 13 shows the same with the coupler applied in position to receive the coating of solder.

In each of the views similar letters of reference are employed to indicate corresponding parts wherever they occur.

A, Figs. 1, 2, 3, and 4, represents a main and B a branch pipe. *a* is a conical seating formed in the pipe A, into which is inserted the conical end *b* of the pipe B. D represents a coupler constructed of lead, and formed externally of the shape desired to be given to the finished joint, and having lips or extensions *d* adapted to embrace the periphery of the pipe A, which is received and held in the groove or channel $D^1$. $d^1$ is a circular opening formed in the body $D^2$ of the coupler D, adapted to receive the pipe B, as shown. The body $D^2$ is formed circular at its extremity $d^2$, and gradually tapering from such extremity $d^2$ up to form the lips *d*. *e e* are holes formed through the coupler D for the passage of solder, as will be hereinafter explained.

According to my invention, T joints are formed as follows: A conical seating, *a*, in the pipe A and a correspondingly-shaped conical end, *b*, to the pipe B having been formed by any suitable means, the coupler D is slid or sprung over the pipe A, so that the pipe A may lie in the channel $D^1$ and be embraced by the lips or extensions *d*. The conical end *b* of the pipe B is then inserted into the conical seat *a* by passing the end *b* of the pipe B up through the opening $d^1$ in the body of the coupler D. The parts having thus been placed in position, as shown by Fig. 3, a quantity of solder is then poured onto the parts and wiped or conducted around, so as to give a coating or covering, C, to the same and form a neat joint similar in appearance to an ordinary plumbers' joint. In wiping or conducting the molten solder C around the parts a portion of the same is caused to flow in through the openings or holes *e* to the interior of the coupler D, thereby more securely uniting the parts together. In forming a straight joint a conical seating, *a*, in the end of the pipe A, and a conical end, *b*, to the pipe B, is first formed, as shown in Fig. 12. The ends *a b* being thus shaped, are brought together within the coupler D, as shown by Fig. 13, after which the molten solder is wiped or conducted around the parts, so as to form a covering or coating, C, to the same, a part of the solder C being caused to flow into the interior of the coupling D through the hole *e*, as in the case of the T-joint previously described. In all cases the coating of solder C is conducted a sufficient distance along the pipes A B, as shown at C′ C′, so as to firmly secure all the parts together.

Having thus described my invention, what I claim, and desire to secure by Letters Patent, is—

1. A plumbers' joint, constructed by uniting pipes A B within a coupler, D, forming the base or body of the joint, and coating or covering and uniting the parts by means of a layer of solder, C, applied externally of the coupler D, in the manner and for the purpose described.

2. A coupler, D, for forming the base or body of a plumbers' joint, constructed with lips or extensions *d*, channel or groove $D^1$, and opening $d^1$, substantially as and for the purpose described.

3. The combination, with a pipe, A, formed with a conical seating, *a*, and a pipe, B, having a conical end, *b*, of a coupling, D, substantially as and for the purpose described.

4. The combination, with a pipe, A, and a branch pipe, B, placed at an angle thereto, of the coupler D, having a groove or channel, $D^1$, to receive the pipe A, and aperture $d^1$ to receive the pipe B, as and for the purpose described.

I. F. VAN DUZER.

Witnesses:
ANTON C. CRONDAL,
FRANKLIN BARRITT.